June 12, 1945.  C. M. MacCHESNEY  2,378,024
STRIP COILING APPARATUS
Filed Aug. 29, 1942  9 Sheets-Sheet 1

Fig. 1

INVENTOR.
Chester M. MacChesney
BY
Davis, Lindsey, Smith & Shonts,
ATTORNEYS.

June 12, 1945.  C. M. MacCHESNEY  2,378,024
STRIP COILING APPARATUS
Filed Aug. 29, 1942   9 Sheets-Sheet 6

INVENTOR.
Chester M. MacChesney
BY Davis, Lindsey, Smith & Shonts
ATTORNEYS

June 12, 1945.    C. M. MacCHESNEY    2,378,024
STRIP COILING APPARATUS
Filed Aug. 29, 1942    9 Sheets-Sheet 9

INVENTOR.
Chester M. MacChesney
BY
Davis, Lindsey, Smith & Shonts,
ATTORNEYS

Patented June 12, 1945

2,378,024

UNITED STATES PATENT OFFICE 2,378,024

STRIP COILING APPARATUS

Chester M. MacChesney, Chicago, Ill., assignor to Acme Steel Company, Chicago, Ill., a corporation of Illinois Application August 29, 1942, Serial No. 456,657

4 Claims. (Cl. 242—74)

This invention relates to improvements in strip coiling apparatus or winding reels and its purpose is to provide a novel and efficient winding core having means for holding the metal strip thereon by suction so that the strip may be readily gripped and held upon coming into engagement with the core under pressure. Although capable of other uses, this improved winding core, capable of automatically gripping a metal strip, lends itself to use with particular advantage in the operation of winding a long flat strip of steel or other strip material into the form of a succession of spiral coils, with no interruption of the movement of the strip between successive winding operations.

In rewinding long metal strips coming from pickling or coating baths or other apparatus, a serious disadvantage has heretofore been presented by the necessity of stopping the movement of the metal strip when changing from one reel to another during the operation of rewinding the strip. This disadvantage is overcome by the present invention which permits a new reel to grip the strip automatically by suction upon being brought into gripping position so that the winding operation may be continued without interruption upon cutting off the oncoming strip from the portion which has just been wound. The improved reel may also be employed with advantage in other locations where it is desired to effect quickly a positive connection between the strip and the core upon which it is to be wound, with a minimum expenditure of time and labor.

It is, therefore, the principal object of the invention to provide a winding reel having a core equipped with suction devices adapted to grip and hold a metal strip when the strip is brought into engagement therewith under pressure. A further object is to provide an improved winding core provided with suction cups which are capable of adjustment with respect to the surface of the core. Still another object is to provide a winding core comprising suction cups which are resiliently mounted and are thereby capable of movement with respect to the surface of the core. Other objects relate to various features and arrangements which will appear more fully hereinafter.

The nature of the invention will be understood from the following specification taken with the accompanying drawings in which one embodiment is illustrated. In the drawings.

Before proceeding with a detailed description of the embodiment of the present invention which is illustrated in the drawings, reference will be made to the principal parts of the winding apparatus with which the improved core of the present invention is associated in the embodiment illustrated. The apparatus includes a pair of winding cores 30 mounted upon a rotatable wheel 31 which is arranged to revolve within a stationary frame 32. The metal strip 33 which is to be wound upon the cores 30 is withdrawn from the rolling mills, cutting apparatus or other equipment by which it is being treated, through the agency of a feeding device 34 which is driven by an electric motor 35 through a speed reducer 36. The metal strip 33 moves in the direction indicated by the arrow 37 and passes around a tensioning device 38 which comprises a suspended wheel or roller about which the strip is looped at a point substantially below the level of the core 30 when this core is in the upper winding position shown in Figs. 1, 20, 21 and 22. The end of the metal strip is held on the upper core 30 by a series of suction cups 40 which exert a sufficient grip on the strip to maintain the end of the strip in place during the coiling operation. The tensioning device 38 maintains tension in the strip within the holding ability of the suction cups and compensates for any tendency to momentary variations in the strip movement arising at the beginning of a winding operation or at other times.

Figures 20, 21, 22, 23, 24, 25, 26:
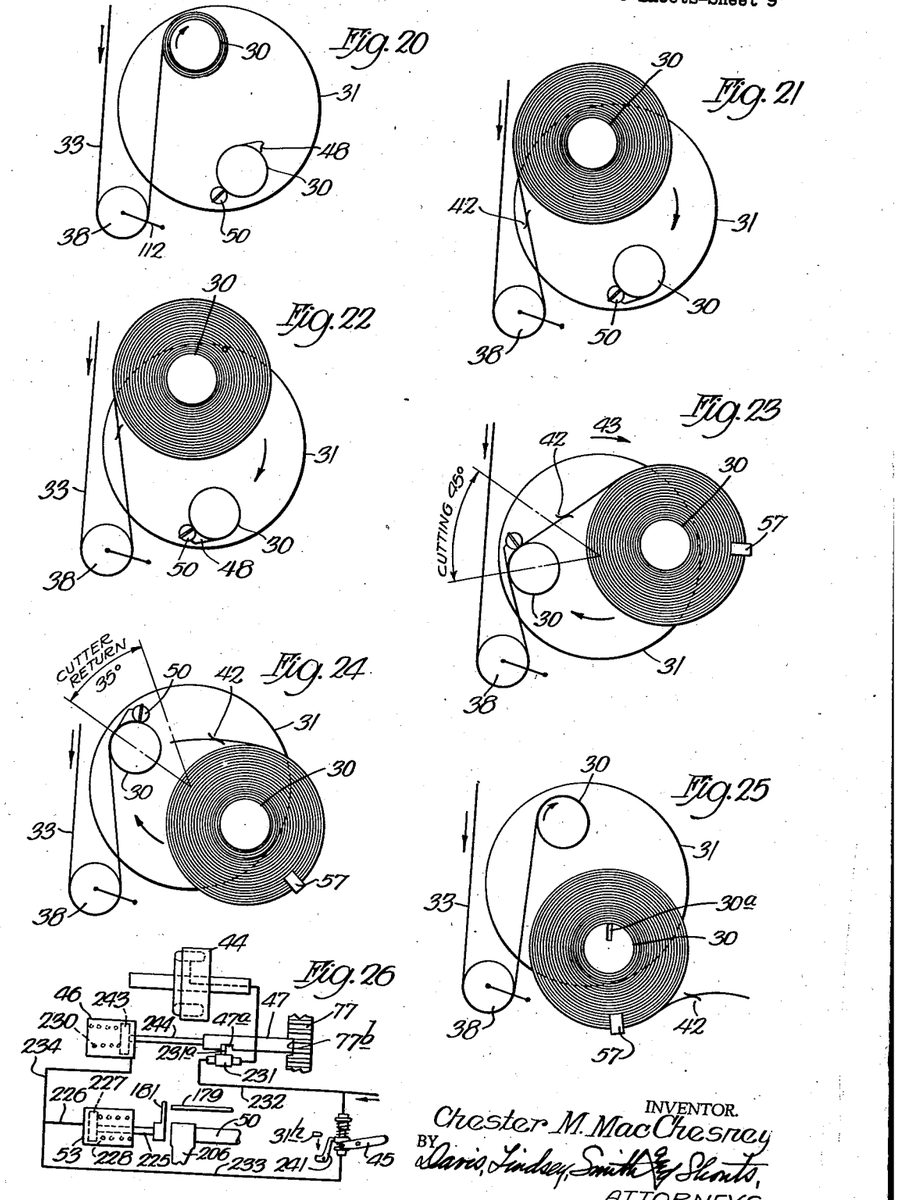
Fig. 20 is a somewhat diagrammatic side elevation of the principal parts of the apparatus illustrated in Fig. 1, showing the wheel or carrier on which two winding cores are mounted with one core in the upper winding position, where the metal strip being coiled is maintained under tension by a suspended tension regulator, and with the other core in the lower unloading position.
Fig. 21 is a diagrammatic side elevation similar to that of Fig. 20, showing the relation of the parts with a full coil of strip material formed upon the upper core and with the lap-welded joint in the strip approaching the coil and with the stop carried by the core in the lower unloading position engaging the end portion of the associated cutter bar which has then been moved endwise for the purpose, thus stopping the rotation of both cores.
Fig. 22 is a diagrammatic side elevation similar to that of Fig. 21, showing substantially the same relationship of the parts except that the clutch for controlling the rotation of the wheel or carrier has been engaged to cause the carrier to revolve through a half revolution and thereby reverse the positions of the winding cores.
Fig. 23 is a diagrammatic side elevation similar to those of Figs. 20 to 22, inclusive, showing the relative position of the parts after the wheel or carrier has rotated through a partial revolution, thereby bending the strip about the empty core which is moving upwardly and thus causing the strip to engage the suction cups carried by that core so that it is held in position on the core during the operation of the cutter which is then moved forward by compressed fluid to sever the strip between the wound coil and the place where it is held on the empty core.
Fig. 24 is a diagrammatic side elevation, similar to those of Figs. 20 to 23, inclusive, showing the relative position of the parts at a later stage in the rotation of the wheel where the strip has been severed adjacent the point where it is held on the empty core and the empty core and the filled core are approaching the winding and unloading positions, respectively.
Fig. 25 is a diagrammatic side elevation, similar to those of Figs. 20 to 24, inclusive, showing the relative positions of the parts after the wheel or carrier has completed a half revolution, thus reversing the positions of the two cores so that the empty core occupies the winding position and begins a new coiling operation while the filled core occupies the unloading position wherein the coil may be removed therefrom.
Fig. 26 shows a diagrammatic plan view of the circuit connections of the cylinders, valves and clutches which are operated by compressed air or the like to control the operation of the cutter bars, the starting and stopping of the wheel or carrier and the rotation and positioning of the wheel.

The cores 30 are power driven in the direction indicated by the arrow 41 and a coil of strip material is thereby formed on the upper core 30 as indicated in Fig. 20. When the formation of the coil has been carried on to the point where a lap-welded joint 42 appears above the tensioning device 38, as shown in Fig. 21, this will constitute a signal to the operator to arrest the winding operation on the core which is then in the winding position and to move an empty core to that position. This is accomplished by rotating the wheel 31 in the direction of the arrow 43 through a half revolution. The rotation of the wheel or carrier 31 is effected by a power connection from the driving motor 35 controlled by an air clutch 44 and, in order to initiate this partial revolution of the wheel, it is necessary for the operator to operate a valve 45 which admits air to a cylinder 46 and thereby releases a latch member 47 by which the wheel is normally located in such a position that one of the winding cores 30 is held in the upper winding position and the other core 30 is held in the lower unloading position shown in Figs. 1, 20 and 21. The actuation of the valve 45 and the resulting movement of the latch member 47 opens another valve which admits air to the air clutch 44 so that the rotation of the wheel 31 begins as soon as it is released by the latch member 47. After being manually opened, the valve 45 is held in open position by a latch and the rotation of the wheel 31 continues through a half revolution when this latch is automatically operated to cause the closing of the valve and the re-engagement of the latch member 47 with a notch in the wheel.

At the same time that the operation of the apparatus reaches the condition shown in Fig. 21 and the valve 45 is operated to release the wheel and cause it to rotate through a half revolution, the rotation of the winding cores about their own axes is arrested through the engagement of the stop member 48, carried by the lower winding core, with a cutter bar 50 carried by the wheel and mounted for longitudinal movement parallel to the axis of the core. A cutter bar 50 is associated with each core 30 and carries a rotatable cutter 51 adapted to sever the metal strip as the cutter bar is moved longitudinally throughout the width of the strip. At the stage of the operation when the wheel 31 is about to be turned through a half revolution, however, the cutter bar of the core which is in the lower unloading position is not moved through a full cutting stroke but is merely moved forwardly a sufficient distance to cause its forward end to lie in the path of movement of the stop member 48 carried by the adjacent core. When this stop member engages the cutter bar a slippage occurs in the driving connection to the rotating cores through a friction driving device 52. The movement of the cutter bar to a position where it will be engaged by the stop member carried by the lower core 30 is effected by an air cylinder 53 to which air is admitted when the valve 45 is actuated by the operator and the actuation of the cylinder 53 also operates a mechanical clutch 54 by which the driving connection to the lower core 30, which may have been broken by a manual operation during the downward movement of the coil, is established at the time of the engagement of the stop member 48 with the cutter bar.

The parts of the apparatus are then in the condition shown in Fig. 22 and the wheel 31 then revolves in the direction indicated by the arrow 43 to move the two cores bodily about the axis of the wheel as shown in Fig. 23. As this takes place, the empty core, which is still held against rotation by the adjacent cutter bar, moves upwardly and bears against the strip 33 at such a point that the welded joint 42 is located between this empty core and the core which is occupied by the full coil of strip material. The tensioning device 38 maintains sufficient tension in the portion of the strip which bears against the empty core 30 to cause the strip to be gripped by the suction cups 40 and the parts are then in readiness for the actuation of the cutter bar 50 associated with this core through its full cutting stroke. The bar is thus actuated at this point by an air cylinder 55 which is associated with it and which is automatically actuated by compressed air or the like through an automatic air valve 56 having parts which are mounted to revolve with the wheel. During the time that the cutting is taking place, the empty core does not rotate but both the core and the cutter move bodily with the wheel and the metal strip 33 continues to be fed to the winding apparatus through the operation of the feeding device 34. The cutting takes place through a certain angle of movement of the wheel 31; for example, an angle of 45 degrees as illustrated in Fig. 23; and, as soon as the cutting is completed, the valve 56 operates to cut off the air to one end of the cutter cylinder and to admit air to the other end thereof so that the cutter bar is automatically returned to its normal position, this return movement taking place through another angle of movement of the wheel 31; for example, an angle of 35 degrees as indicated in Fig. 24.

Before the cutting operation takes place, and during the downward movement of the coil, a clip 57 is applied to the coil of strip material on the filled reel to prevent the material from unwinding, and this may be facilitated by throwing out the associated clutch 54 to stop the rotation of the core. After the operator has manually actuated the clutch 54 associated with the filled core to break the driving connection to this core, the core may be rotated to position properly the core slot 30ᵃ so that a hook may be entered through this slot to permit the removal of this coil of material by a hoist or the like after contracting the core. After the strip has been cut off, as shown in Fig. 24, the coil of material is separated from the supply and the parts are in readiness for beginning a new winding operation which is initiated as soon as the cutter bar returns to its normal position, which corresponds approximately to the completion of a half revolution. When the loaded core 30 reaches the unloading position shown in Fig. 25, the valve 45 is automatically actuated by a part carried by the wheel so that the latch member 47 is permitted to effect an automatic positioning of the wheel and the supply of compressed air to the clutch 44 is cut off to arrest the operation of the driving connection to the wheel.

Of course, as soon as the air pressure is cut off from the cylinder 55 associated with the core 30 which is moving to the upper winding position in Fig. 24, the cutter bar is fully retracted by air pressure, controlled by the valve 56, so that, when the parts reach the positions shown in Fig. 25, the winding operation is immediately resumed with the metal strip being wound upon the upper core 30 and, at this time, the operator removes the wound coil from the core which then occupies the lower position. In this way, the feeding of the strip material is carried on continuously and the coiling of the strip is carried on without any interruption except during the limited time which is required for the movement of the wheel or carrier 31 through a half revolution.

Having indicated generally how a continuous winding operation may be carried out with the use of the apparatus of the present invention, the structure of the apparatus will now be more particularly described. It includes a plurality of supporting plates 60 which are secured to the floor and which are provided with longitudinal grooves 60ᵃ having mounted therein a plurality of blocks 61 which are welded to and directly support the frame 32. This frame includes a plurality of longitudinal frame members 63 of channel form which have their lower flanges resting directly on the blocks 61, and a plurality of transversely extending channel members 64 which are welded or otherwise secured to the members 63. The blocks 61 are held in adjusted position by locking members 65 which have flanges overlying their edges and these locking members are secured to the supporting plates 60 by cap screws 66. By adjusting the machine on the floor plates 16, the winding cores may be properly aligned with the moving strip.

Figure 1:
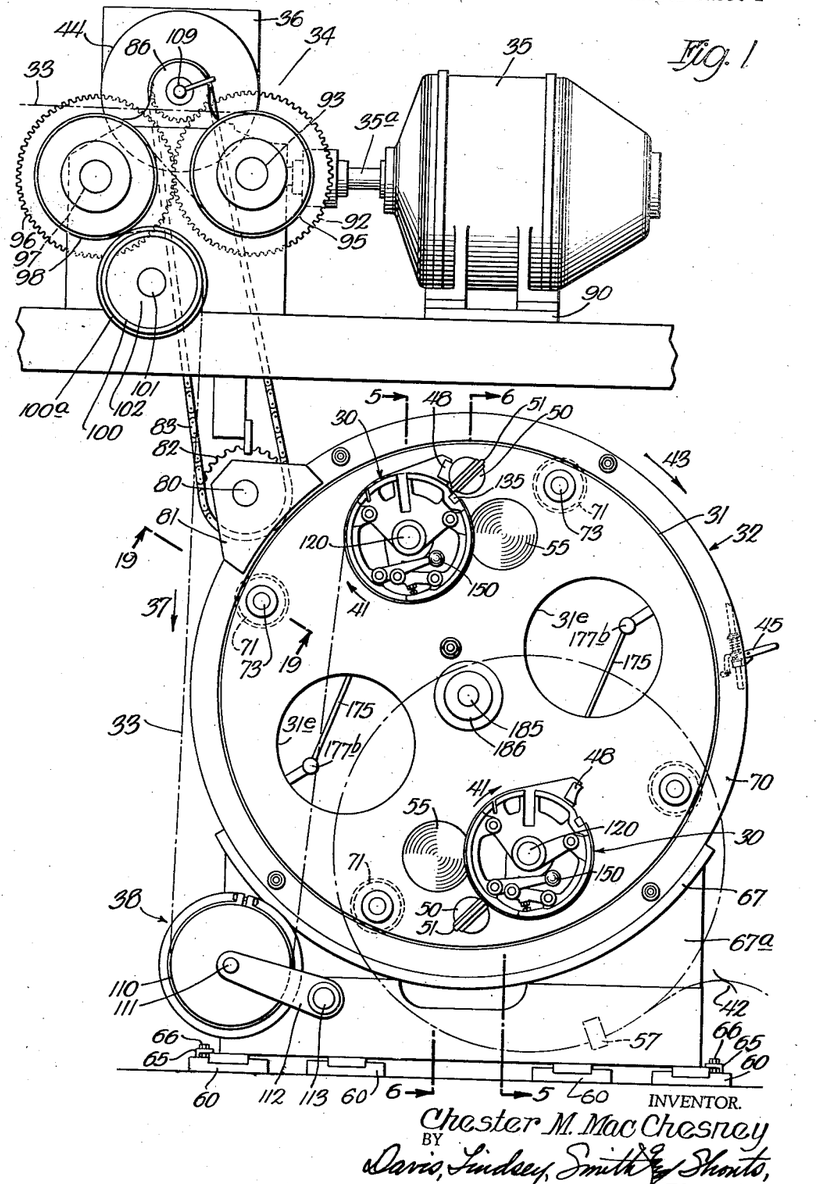
Figure 1 shows a side elevation of one form of strip coiling apparatus embodying the improved winding core of the present invention and capable of carrying on a winding operation in a continuous process.
Figure 5:
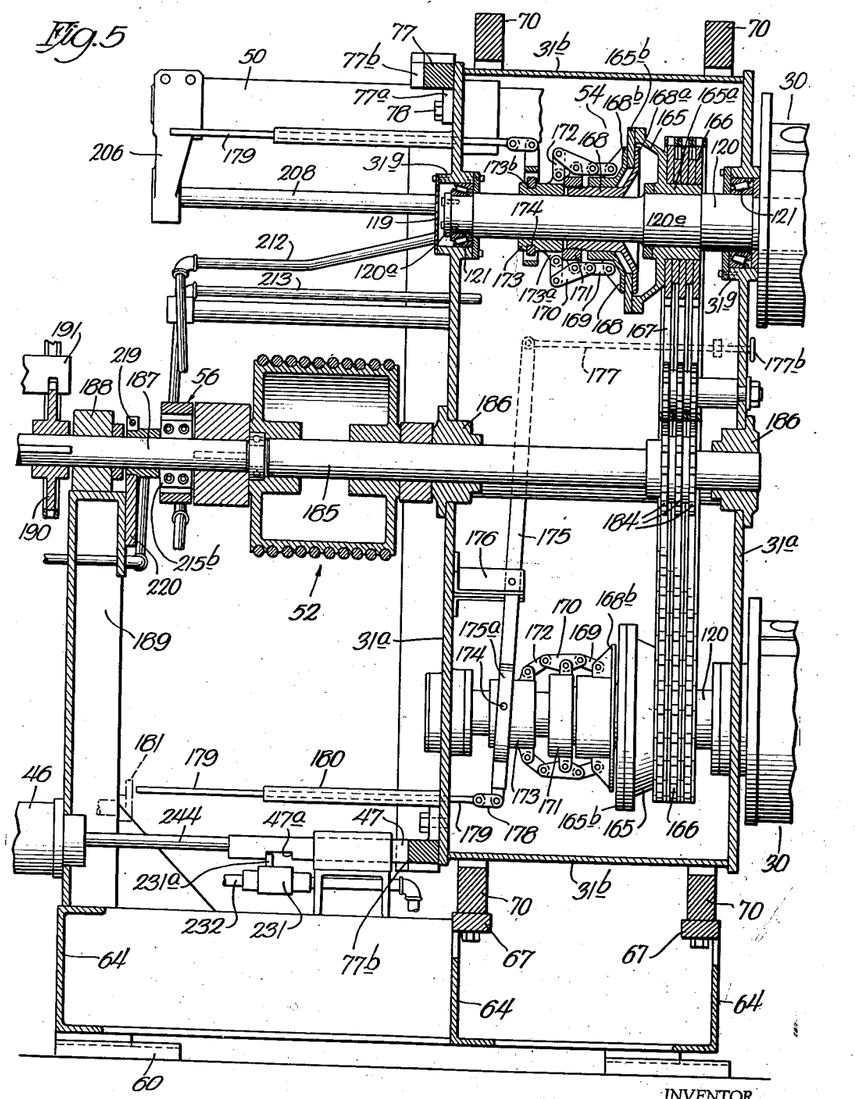
Fig. 5 shows a sectional view taken on the irregular line 5—5 of Fig. 1.

The frame structure made up of the channel beams 63 and 64 carries a pair of saddle-shaped frame members 67 comprising vertical plates 67ᵃ, all of which are secured to the top flanges of two of the frame members 64, as shown in Figs. 1 and 5. The arcuate flanges of the saddle members 67 are secured by studs 69 to circular frame members 70 which serve as supports for the revolvable wheel 31 which is mounted within them. This wheel comprises a pair of circular plates 31ᵃ connected by an annular drum or cylinder 31ᵇ which is welded or otherwise secured thereto and which spaces the disks apart to form an internal chamber in which the clutches 54 and other parts of the mechanism are mounted. The drum 31ᵇ is recessed or bowed inwardly at intervals to form pockets 31ᶜ, shown in Fig. 3, which are adapted to contain the flanged rollers 71, illustrated in Figs. 3 and 19, which are spaced apart by sleeves 72 and journaled upon rods 73 secured by set screws 74 in bosses 31ᵈ formed in the disks 31ᵃ.

The flanged rollers 71 are mounted to travel upon the inner annular surfaces of the frame members 70 which serve as tracks therefor and the wheel 31 is thus capable of being revolved within the bearings which are formed by these circular frame members. The two disks 31ª have a pair of large apertures 31ᵉ punched therein and bounded by tubular members 31ᶠ, which form spacers for the disks 31ª.

Figures 3, 4:
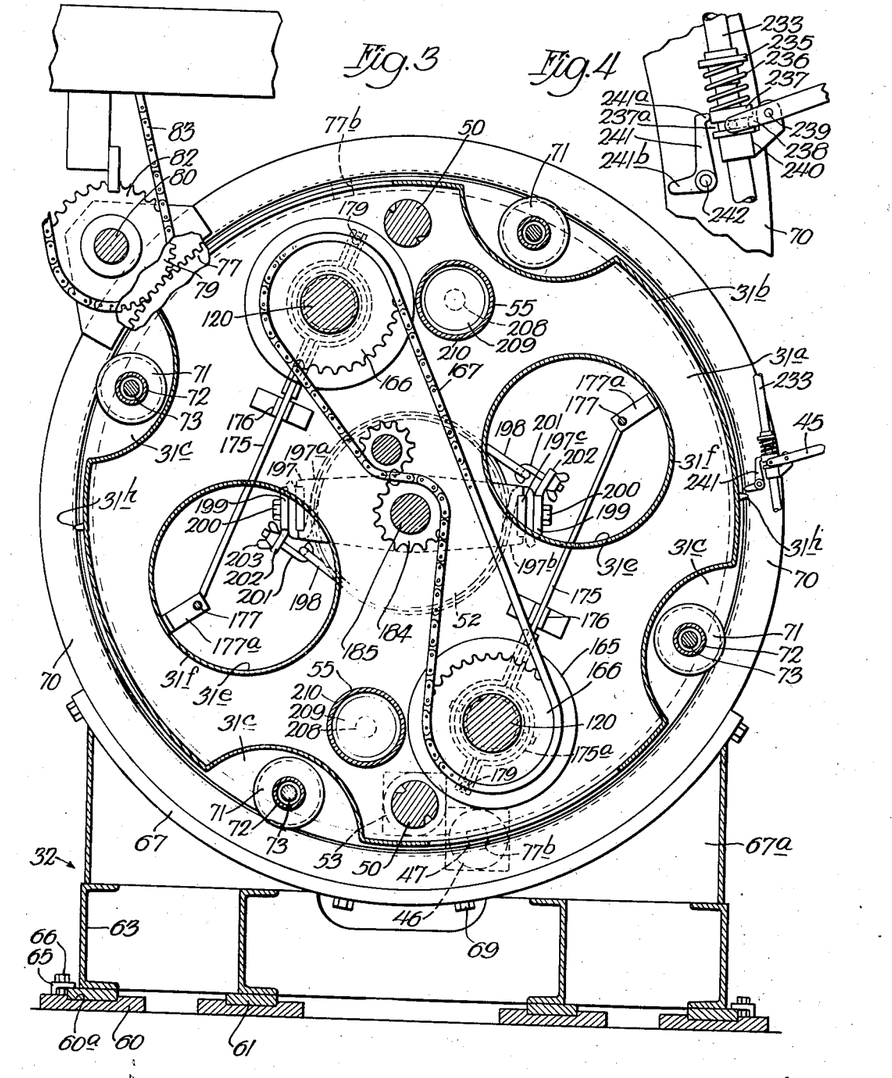
Fig. 3 shows an enlarged sectional view taken on the line 3—3 of Fig. 2.
Fig. 4 shows an enlarged side elevation of the valve mechanism for controlling the positioning of the rotatable wheel or carrier on which the cores or winding reels are mounted.

The inner one of the two circular disks 31ª carries an annular gear 77 which is secured thereto by threaded studs 78 engaging the inwardly engaging flanges 77ª of the gear and threaded apertures in the adjacent disk 31ª. The annular gear 77 is driven by a pinion 79 which is secured upon the end of an intermediate shaft 80 journaled in bearing blocks 81 fixed on the outer parts of the circular frame members 70, as illustrated in Figs. 1 and 3. The shaft 80 has fixed thereon a double sprocket gear 82 which meshes with a double sprocket chain 83 driven by a double sprocket pinion 84 fixed upon a driving shaft 85. This shaft is journaled in bearings 86 mounted on the upper ends of frame members 87 which are in turn mounted upon longitudinal frame members 88 carried by transverse frame members 89, all of which form a part of an overhead frame structure separated from the frame 32 previously described. The shaft 85 is driven by the previously described speed reducer 36 which is also mounted upon the frame members 88. These frame members also carry a plate 90 upon which there is mounted the previously described electric motor 35 having a shaft 35ª through which the speed reducer 36 is actuated.

Figure 2:
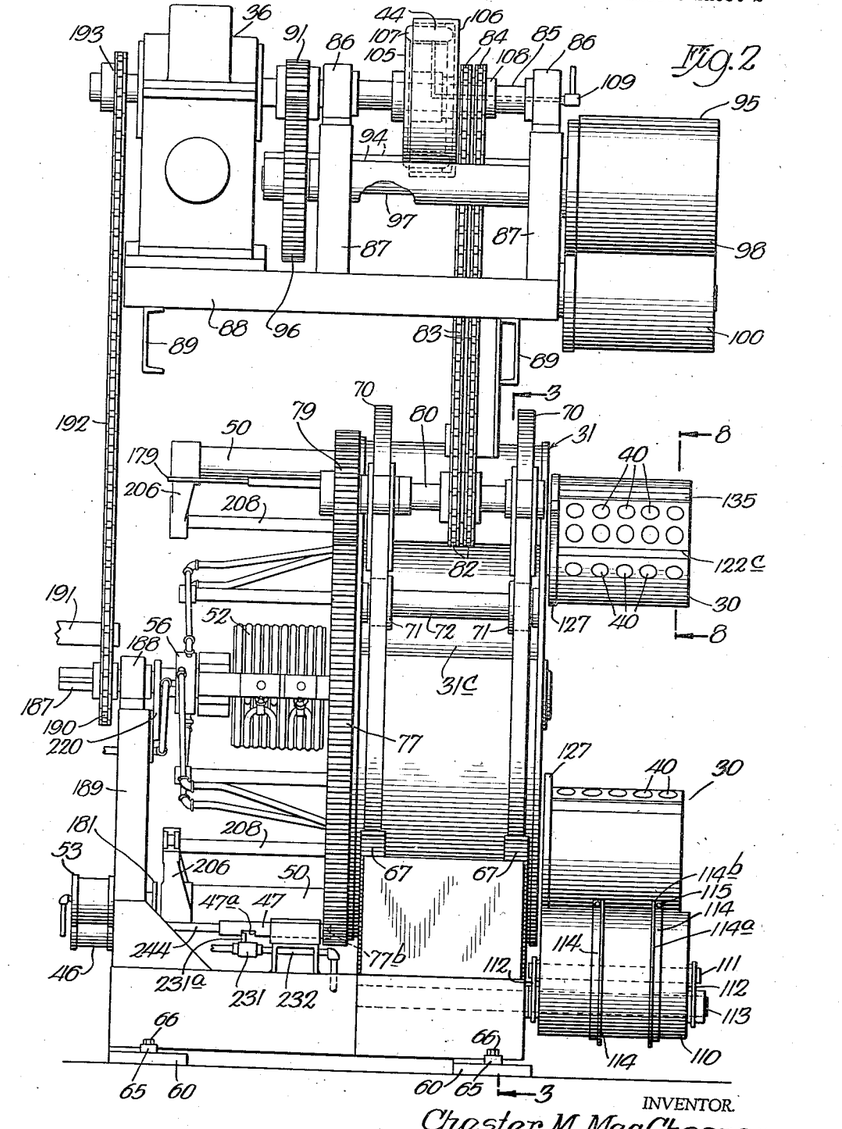
Fig. 2 shows an end view of the apparatus illustrated in Fig. 1.

On the driving shaft 85, there is fixed a pinion 91 which meshes with a gear 92 secured upon a shaft 93. This shaft is journaled in bearings mounted within a tubular member 94 which is secured to the frame members 87. On the end of the shaft 93 which projects to the right, as shown in Fig. 2, beyond one of the frame members 87, there is secured a cylindrical pulley or roller 95. The gear 92 also meshes with another gear 96 which is fixed upon another shaft 97 also journaled in bearings carried by another tubular member 94 secured to the frame members 87. This shaft 97 has secured thereon a cylindrical pulley or roller 98 which is of substantially the same size as, and parallel to, the roller 95. The axis of the shaft 93 is located at a slightly higher elevation than the axis of the shaft 97 so that the metal strip 33, as it passes from the mills or other device by which the strip is treated, is carried over and above the roller 98 and contacts with the roller 95. After passing around the roller 95, it is carried around the roller 98 and it then passes partially around an idler roller 100 which is journaled upon a stub shaft 101 carried by the upper frame structure and projecting horizontally therefrom parallel to the shafts 93 and 97. A collar 102 secured upon the end of this shaft holds the roller 100 against endwise movement. This roller has a layer 100ª of rubber or the like forming its outer peripheral portion and it is mounted so that the metal strip 33 passing between this roller and the roller 98 contacts the surfaces of both rollers, the compressible outer layer of the roller 100 accommodating itself by its own deformation to any variations in the gauge of the strip which passes between these rolls. After passing over the upper surface of the roll 100, the strip 33 is directed downwardly to the tensioning device 38 previously described.

The shaft 80, by which the rotation of the wheel 31 is effected, is driven from the shaft 85 through the sprocket chain 83, as previously described, and this driving action is controlled by the air clutch 44 which comprises two cup-shaped members 105 and 106 having mounted between them an annular hollow rubber ring 107 adapted to be inflated by compressed air or the like to provide a driving connection between the cup-shaped members 105 and 106, as shown in Fig. 2. The inner member 105 is fixed on the shaft 85 and the outer cup-shaped member 106 is rotatably mounted on that shaft and has secured on its hub portion the sprocket pinion 84 which is driven by the sprocket chain 83. A collar 108 is secured on the shaft 85 to hold the member 106 against endwise displacement. The hollow ring 107 is carried by the clutch member 105 and a connection is made from the interior of the ring through the member 105 and the shaft to a swivel coupling 109 having connection with a pipe through which compressed air or the like is supplied to effect the desired inflation of the ring at the proper point in the cycle of operations.

The tensioning device 38, about which the strip passes in its travel from the feeding device 34 to the winding position, comprises a cylindrical roller 110, shown particularly in Figs. 1 and 2, which is mounted on a shaft 111 carried at the outer ends of a pair of arms 112 pivoted at 113 upon the frame 32. The roller 110 is thus free to move downwardly by its own weight to maintain the strip 33 taut and this tendency may be increased by mounting weights upon the arms 112 or by applying springs thereto. A pair of guide straps 114, having radially extending annular flanges 114ª, are secured upon the outer surface of the roll 110, being held by clamping screws 115 engaging the projecting ears 114ᵇ thereof. These guide straps may be spaced apart to correspond with the width of the strip material 33 being coiled so that the strip is guided at all times as it moves around the tensioning device and thence upwardly to the core 30 which is in the winding position.

Figures 8, 9:
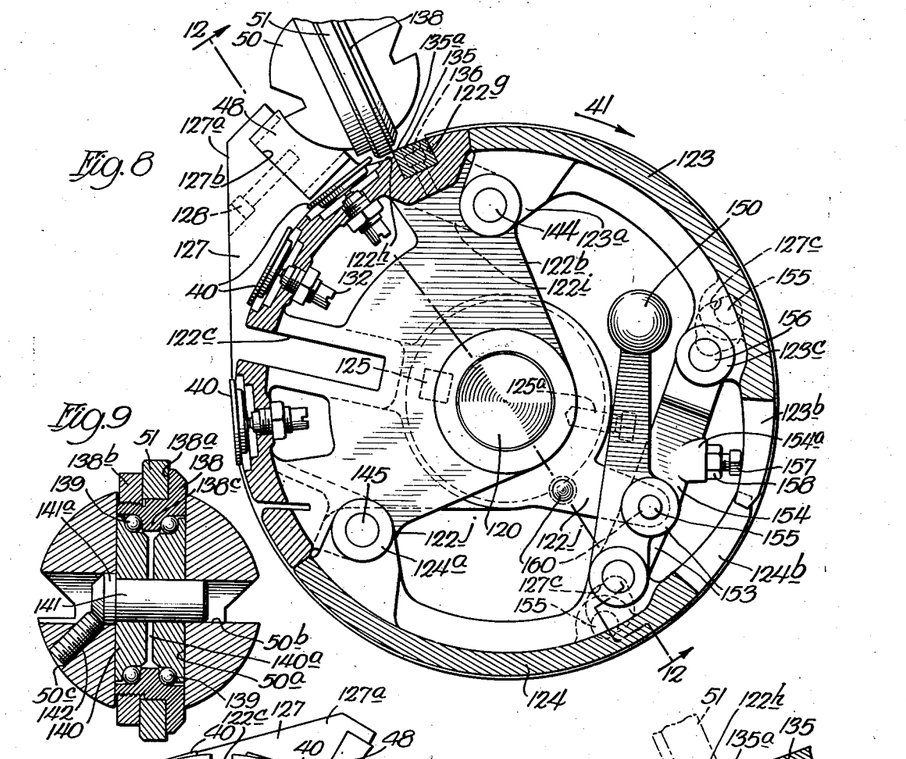
Fig. 8 is an enlarged sectional view through one of the winding cores taken on the line 8—8 of Fig. 2.
Fig. 9 is a transverse section through one of the cutter bars and its cutter, one of these cutters being mounted for movement adjacent each of the winding cores.
Figures 10, 11:
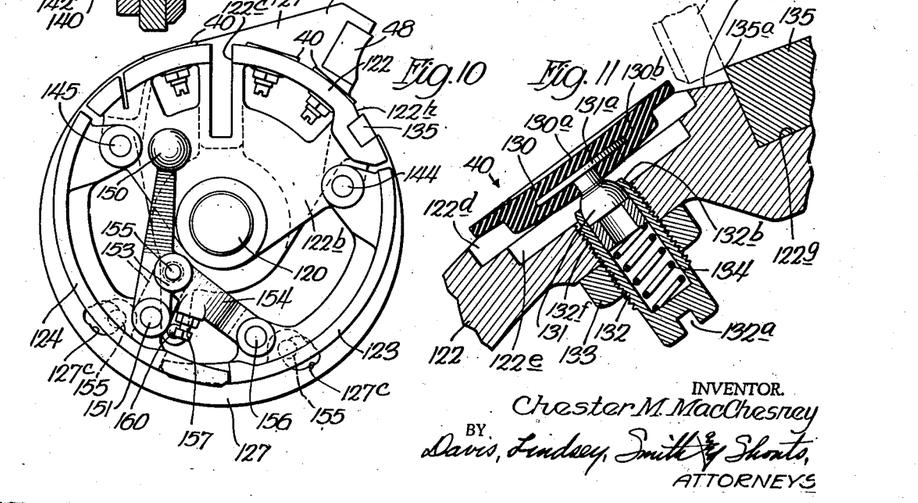
Fig. 10 shows an end elevation of one of the winding cores, illustrating the mechanism by which it may be contracted to release a coil of strip material wound thereon.
Fig. 11 is an enlargement of a portion of the sectional view of Fig. 8, with the mounting of one of the suction cups of the winding reel also shown in radial section.

The two cores 30 upon which the strip material is wound are identical and their construction is best illustrated in Figs. 5 and 8 to 13, inclusive. Each core is secured upon a shaft or trunnion 120 which is journaled in two sets of roller bearings 121 mounted in the flanged apertures 31ᵍ formed in the side disks 31ª of the wheel 31, as illustrated in Fig. 5. Each shaft 120 has attached thereto an outwardly extending flange or enlargement 120ª at its inner end which bears against the inner roller bearing unit 121 to hold the shaft against forward displacement. Cover plates 119 are mounted over the apertures in the inner disk 31ª in which the inner roller bearing units 121 are located. The forward portion of each shaft or trunnion is tapered as shown at 120ᵇ in Fig. 12, the tapered part connecting a larger cylindrical portion 120ᶜ with a smaller cylindrical portion 120ᵈ upon which there are mounted the hub portions of the radially extending webs 122ª and 122ᵇ of the segment 122 which constitutes a part of the cylindrical core. This segment is arcuate in radial cross section, as shown in Fig. 8, so that it forms a a part of the cylindrical surface of the core and it has mounted thereon the suction cups 40, previously described, which are mounted in rows both longitudinally and circumferentially of the core. The body portion of the member 122 cooperates with the complementary arcuate members 123 and 124 to form a complete cylindrical surface when these parts are in the normal positions shown in Fig. 8. When they are contracted, as shown in Fig. 10, they permit the removal of the coil of strip material which has been wound thereon.

The inner web 122ᵃ of the part 122 is secured on the cylindrical part 120ᶜ of the spindle by a key 125 and a set screw 125ᵃ and this web portion has secured thereto by a stud 126 a radially extending plate 127 which is seated on the hub of the part 122ᵃ and has a radially projecting arm 127ᵃ carrying the stop member 48 previously referred to. This stop member is in the form of a hard metal block which is mounted in a recess 127ᵇ in the arm 127, being grooved at its upper and lower edges to receive portions of the arm at the edges of the recess. The stop member 48 is secured to the arm 127 by a stud 128. With this arrangement, the block 48 may be readily removed and replaced when desired. The body portion of the member 122 is provided with a radially extending slot 122ᶜ, shown in Fig. 8, which permits the insertion of a hook carried by a hoist or the like for the purpose of removing a wound coil from the core after the core has been contracted.

The arcuate body portion of the segment 122 of the core is provided with a plurality of recesses 122ᵈ which are of stepped formation, being of reduced diameter at their bottoms as shown at 122ᵉ. These recesses are adapted to receive the body portions of the suction cups 40, each of which comprises a cup-shaped member 130, formed of rubber or the like, which is concaved on its outer side as shown at 130ᵃ, and which has an inner body portion 130ᵇ of reduced diameter which may enter the reduced portion 122ᵉ of the recess when the cup is pressed inwardly. The rubber member 130 is carried by a stem 131 which is provided at its outer end with a circular plate or flange 131ᵃ embedded in the body portion of the member 130. This stem has a hollow cylindrical portion which is slidably mounted in a retaining member 132, constructed in the form of a hollow cylinder closed at its inner end and threaded on its outer surface to engage the threaded aperture 122ᶠ which is formed in the body portion of the segment 122 centrally of the bottom portion 122ᵉ of the recess. The retaining member is provided at its inner end with a slot 132ᵃ adapted to be engaged by a screwdriver or the like for adjusting the position of the retaining member in the segment 122 and after the adjustment has been made the retaining member may be held in adjusted position by a lock nut 133. After the stem 131 has been inserted in the cylinder of the retaining member, the outer end of this retaining member is bent inwardly as shown at 132ᵇ to conform to the curved contour of the outer portion of the stem, thus limiting the outward movement of the stem under the influence of a coil spring 134 which is mounted in the cylinder. In this way the cups 40 are all resiliently mounted and when the metal strip 33 is pressed against them they are adapted to move inwardly and to be flattened out on their outer faces so that a suction is set up and the cups maintain a firm grip on the metal strip. The retaining members may be adjusted to position the suction cups uniformly and to suit the gauge and flexibility of the metal strip and the tension exerted thereon so that each cup will maintain a firm grip on the end portion of the strip.

At the forward edge of the series of suction cups, having in mind the direction of rotation indicated by the arrows 41, the segment 122 of each core is provided with a longitudinally extending groove 122ᵍ of rectangular cross section which is adapted to receive a cutting or shearing blade 135. This shearing blade is held in the groove 122ᵍ by a series of studs 136 which enter recesses in the blade and pass through into threaded apertures in the underlying portion of the segment 122, as illustrated in Fig. 8. The outer face of the segment 122 is further provided with a longitudinal inclined recess 122ʰ adjacent the groove 122ᵍ which leaves the cutting edge 135ᵃ of the cutting or shearing blade exposed in position to cooperate with the rotary cutting blade 51, previously referred to, which is carried at the end of the adjacent cutter bar 50. The cutter 51 is constructed in the form of an annular ring, shown particularly in Fig. 9, which is carried by a holder 138 having an annular recess 138ᵃ in which the cutting blade is seated. One wall of this recess is in the form of a detachable annular ring 138ᵇ which may be removed to permit the blade to be removed and sharpened or replaced. The holder 138 is also in the form of an annular ring having an inner annular rib 138ᶜ which forms two raceways for two series of balls 139 which travel in raceways formed in the outer periphery of a bearing member 140 made up of two similar complementary parts. This bearing member 140 and the holder 138 are mounted in a slot 50ᵃ which extends inwardly from the forward end of the cutter bar 50. The holder 138 and the cutting blade 51 are of such dimensions that their peripheries extend beyond the walls of the slot 50ᵃ to permit the rotary cutter 51 to cooperate with the cutting blade 135 when the cutter bar 50 is moved forwardly in the manner hereinafter more particularly described. The bearing member 140 is secured within the slot 50ᵃ by a pin 141 which fits within a transverse aperture 50ᵇ formed in the cutter bar. This pin has a head 141ᵃ provided with an annular inclined face adapted to be engaged by a set screw 142 which is mounted within an inclined threaded aperture 50ᶜ formed in the cutter bar. The parts of the bearing member 140 are spaced slightly to provide a radial passage 140ᵃ which permits lubricant to pass between the raceways of the ball bearings 139 and also to lubricate the surfaces of the pin 141.

The segment 123 is provided toward its ends with inwardly extending flanges which carry pairs of spaced ears 123ᵃ which extend on opposite sides of two inwardly extending ears 122ⁱ which are formed on the segment 122. These ears are provided with registering apertures which are engaged by pivot pins 144, the pins being secured in the inner ears 122ⁱ so that the segment 123 is thus mounted for pivotal movement with respect to the segment 122. In a similar manner, the segment 124 is provided with inwardly extending flanges provided with spaced pairs of ears 124ᵃ which receive between them other ears 122ʲ which are formed on the member 122. These registering pairs of ears are engaged by pivot pins 145 which are secured in the inner ears 122ʲ so that the segment 124 is thus mounted for pivotal movement with respect to the segment 122.

The two segments 123 and 124 are provided at their edges opposite the pivots 144 and 145 with circumferentially extending teeth 123ᵇ and 124ᵇ which intermesh slightly with each other when the segments 123 and 124 are pivoted outwardly to their normal positions, as shown in Fig. 8, wherein their edge surfaces abut against the longitudinal edges of the segment 122 and wherein they cooperate with the member 122 to form a complete cylinder. When the segments are pivoted inwardly to contract the core, as shown in Fig. 10, these teeth 123ᵇ and 124ᵇ intermesh with each other to a greater extent and limit the inward swinging of the two movable segments.

Figure 12:
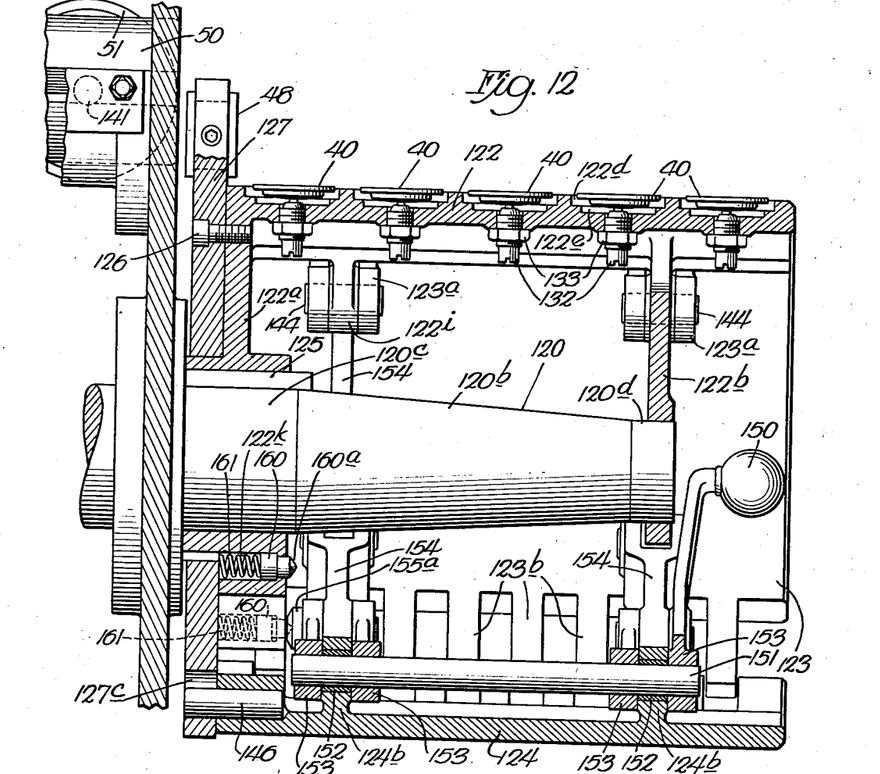
Fig. 12 shows an axial section through one of the winding cores on the line 12—12 of Fig. 8, showing the condition of the parts when the core is expanded.
Figure 13:
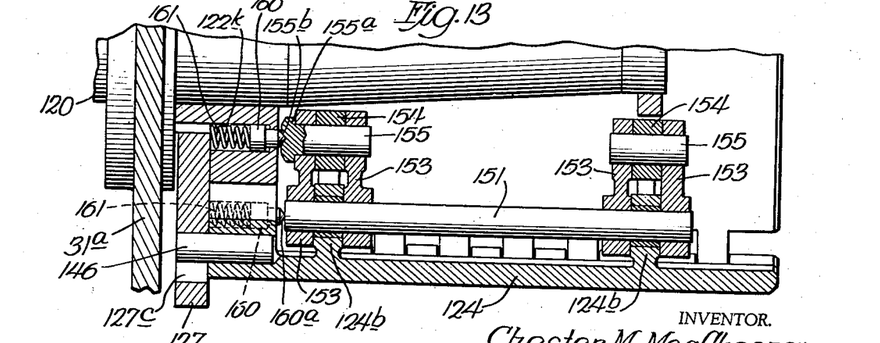
Fig. 13 is a partial sectional view similar to that of Fig. 12, showing the condition of the parts of the core when it has been contracted to permit the removal of a coil of strip material.

The relative pivotal movement of the segments 123 and 124 is further limited, adjacent their free edges, by pins 146 which are mounted in sockets formed in the inner end portions of these segments and which engage slots 127ᶜ formed in the plate 127 attached to the intermediate segment 122. These slots 127ᶜ are elongated, as shown in Figs. 8 and 12, and, when these pins are in the outer ends of these slots, the segments 123 and 124 will be in their expanded positions, shown in Fig. 8, wherein the core has a cylindrical form. When the pins 146 occupy the inner ends of these slots, the core will be contracted to permit the removal of the coil of material wound thereon.

The pivotal movement of the segments 123 and 124 is effected by toggle mechanism operated by a crank handle 150. This crank handle is secured upon the end of a shaft 151 which is journaled in bushings 152 mounted in the bosses 124ᵇ formed on the pivotal segment 124, as illustrated in Fig. 12. The crank handle 150 is formed integrally with an arm 153 extending radially from the shaft 151 and another such arm 153 is secured on the shaft at the other side of the adjacent bushing 152. These arms receive between them the end of a link 154 which is pivoted to the arms 153 by a pin 155. The other end of the link 154 extends between a pair of ears or bosses 123ᶜ which are formed on the inner side of the other pivoted segment 123 and this link is connected to these ears or bosses 123ᶜ by a pivot pin 156. Similarly, at the inner end of the shaft 151, another pair of arms 153 are secured on the shaft and are pivotally connected by a pin 155 with a link 154 which is connected by a pivot pin 156 with other ears 123ᶜ carried by the inner side of the segment 123 adjacent its free edge.

With the foregoing arrangement, it will be apparent that when the arms 153 and the links 154 substantially align with each other, as shown in Fig. 8, the segments 123 and 124 will be in their expanded positions. As a matter of fact, the pivot pins 155 should swing slightly beyond a plane passing through the axis of the shaft 151 and the pins 156 when the segments are in this expanded condition and in order to insure this result when the links are actuated by turning the shaft 151 through the agency of the crank handle 150, set screws 157 are mounted in bosses 154ᵃ carried by the links 154 and arranged to engage the teeth 123ᵇ of the segment 123 when the core is expanded. These set screws may be adjusted to secure any desired operation of the toggle formed by the arms 153 and the links 154 and they may be secured in adjusted position by the lock nuts 158. When the crank handle is swung toward the left, as viewed in Fig. 8, the parts assume the relative positions shown in Fig. 10, where the segments 123 and 124 are swung inwardly. In order that the segments may be located in either position, the radial portion 122ᵃ of the intermediate segment 122 of the core is provided with an arm 122ʲ which projects in a radial plane, as shown in Fig. 8, and this arm is provided with cylindrical bores 122ᵏ in which are mounted the body portions of locking pins 160. These locking pins are pointed at their extremities which project through reduced apertures in the outer faces of the arm 122ˡ, as shown at 160ᵃ, and they are normally forced outwardly by coil springs 161. The pivot pin 155 which connects the arms 153 and the link 154 at the inner end of the core, is provided with an enlarged head 155ᵃ having a cone-shaped recess 155ᵇ therein which is adapted to be engaged by the pointed extremity of either one of the pins 160. These pins are so positioned that when the segments 123 and 124 are contacted, as shown in Fig. 10, the innermost pin 160 will automatically slide over the rounded head 155ᵃ of the pin and engage the recess 155ᵇ, thus holding the segments in the contracted position. When the crank handle 150 is operated to expand the segments, the outermost pin 160 will, in a similar manner, move into automatic engagement with the socket of the pin 155 and thus hold the segments 123 and 124 in their expanded position. It will, of course, be apparent that the segments are also held in their expanded position by the toggle action of the arms 153 and the links 154.

Having described the means for contracting the cores 30 to permit the removal of a coil of wound material, reference will now be made to the means for rotating these cores during the winding operation. Referring to Fig. 5, it will be seen that each shaft 120 of a winding core has mounted thereon one of the friction clutches 54 previously referred to and that each clutch includes a cup-shaped clutch member 165 which has its hub portion 165ᵃ rotatably mounted but fixed against endwise movement upon a portion 120ᵉ of the shaft. This hub portion has secured thereto a sprocket gear 166 adapted to be driven by a sprocket chain 167 in the manner hereinafter described. The clutch member 165 has secured thereto around its outer periphery an inwardly extending flange 165ᵇ which may be faced with leather or other non-metallic material and which extends on the outer side of the radiating annular flange 168ᵃ of a clutch member 168 which is splined upon the shaft 120 for longitudinal movement thereon. This clutch member 168 has mounted thereon a movable annular shoe 168ᵇ which is adapted to be moved into engagement with the flange 165ᵇ to press this flange against the flange 168ᵃ and thus form a driving connection between the two complementary clutch members 165 and 168, thereby causing the shaft 120 to be driven through the agency of the sprocket chain 167.

The clutch shoe 168ᵇ is connected through a series of links 169 with a series of small levers 170 which are pivoted upon a ring 171 having threaded engagement with the cylindrical body portion of the member 168. The levers 170 are pivoted at their intermediate points on the member 171 and their ends opposite the pivotally connected links 169 are in turn pivotally connected with other links 172 which have their opposite ends pivotally connected with ears 173ᵃ projecting outwardly from the clutch ring 173. This clutch ring is splined on the shaft and is provided with an annular groove 173ᵇ engaged by clutch actuating pins 174 which are carried by a clutch actuating lever 175. This lever has a part 175ᵃ which surrounds the clutch ring 173 and which has mounted therein the pins 174. At its intermediate point, this clutch lever 175 is pivoted on brackets 176 which are carried by the inner disk 31ᵃ of the wheel or carrier 31. At one end, each clutch operating lever 175 is pivotally connected to an actuating rod 177 which extends axially of the wheel and through an aperture 31ᶜ in the front disk 31ᵃ thereof, adjacent to which it is slidably mounted in a supporting bracket 177ª, as shown in Figs. 3 and 5. The rod 177 is provided on the front side of the wheel with a handle 177ᵇ by which it may be manipulated to effect longitudinal movement of the clutch ring 173 on the shaft and thereby shift the member 168ᵇ to engage or disengage the friction ring 165ᵇ and thus make or break a driving connection between the shaft and the clutch member 165. At its other end, each clutch actuating lever 175 is pivotally connected to a link 178 which is in turn pivotally connected to another actuating rod 179. These rods 179 are mounted to slide in sleeves 180 which are fixed upon and extend inwardly or rearwardly from the rear disk 31ª of the wheel. Each rod 179 is adapted to be actuated by a shoe 181 which is in turn operated when the associated cutter bar 50 is moved outwardly to engage one of the stops 48 and thereby arrest the rotation of the reel.

As shown particularly in Fig. 3, the endless sprocket chain 167, which rotates the clutch member 165, is arranged to mesh with and extend around a part of the peripheral portion of a sprocket pinion 184 which is secured upon a central driving shaft 185. The shaft 185 is mounted in alignment with another shaft 187 to which it is connected through the friction driving device 52 previously described. The shaft 187 is journaled in a bearing block 188 carried by the portion 189 of the frame structure and, at the rear of the bearing block 188, the shaft 187 has splined thereon a sprocket gear 190. This sprocket gear is maintained against endwise displacement by a notched plate 191 and it is driven, as shown in Fig. 2, by a sprocket chain 192 which passes around a sprocket pinion 193 fixed upon the projecting end of the main shaft of the gear reducer 36, this being the shaft upon which the driving pinion 91 is also secured. By this arrangement, a continuous driving force may be applied from the gear reducer through the sprocket chain and the connected shafts to the sprocket chain 167 by which the clutch members 165 are rotated, except as slippage may be permitted by the friction driving device 52 which is illustrated in Figs. 2, 3, 5 and 14.

Having described the means for rotating the cores 30, reference will now be made to the means for actuating the cutter bars 50 to control the rotation of the cores and to effect the cutting of the strips after a full coil has been formed on one of the cores. These cutter bars 50, which have the cutters 51 mounted in their forward ends in the manner heretofore described, are carried by the wheel 31 in the manner shown particularly in Figs. 6 and 7 where it will be seen that each cutter bar is adapted to be projected through an aperture 31ᶠ formed in the front disk 31ᵇ of the wheel or carrier while the intermediate portion of the cutter bar is journaled in a bearing member 205 carried by the rear disk 31ª of the wheel. Each cutter bar 50 is supported at its forward end by a pair of blocks 244 having bevelled edges which fit into longitudinal grooves 50ᵈ in opposite sides of the cutter bar. The upper wall of each groove is inclined to fit the bevel of the supporting block and the blocks 244 are secured by screws 245 to the opposite ends of a semi-circular bracket 246 secured on the front wall 31ª of the wheel 31. One block 244 is slotted for engagement by its screw 245 and an adjusting screw 247, mounted in the bracket, engages this block so that the spaced relation of the two supporting blocks may be regulated to secure the desired engagement with the cutter bar. Each cutter bar has secured thereon at its rear end a transversely extending bracket 206 which is bifurcated at its inner extremity to embrace a disk 207 secured upon the end of a piston rod 208. The bracket 206 has a tooth 206ª engaging the annular groove 207ª formed in the disk so that a driving connection is formed between the bracket and the piston rod without interfering with the free movement of the piston rod. This piston rod is connected at its other end to a piston 209 which is mounted to reciprocate in a cylinder 210. The cylinder heads 210ª and 210ᵇ of each cylinder are mounted in the rear and front disks of the wheel 31, respectively, and a fluid tight joint is formed around each piston rod 208 by a packing chamber and a packing gland 211. Air is adapted to be admitted to the left-hand end of each cylinder, as viewed in Fig. 6, through a pipe 212, thus causing the piston 209 to execute a forward stroke and thereby move the cutter bar transversely to the strip 33 being wound and cutting off this strip in the manner previously referred to. After the cutting operation has been completed, compressed air or other fluid is adapted to be admitted to the other end of the cylinder through a pipe 213, whereupon the piston executes a reverse stroke and returns the cutter to its normal position shown in Fig. 6.

The admission of compressed air or the like to the cylinders 210 is controlled by the automatic valve 56 previously referred to which is actuated by the rotation of the wheel or carrier 31. This valve mechanism is shown particularly in Figs. 2, 6, 13, 16, 17 and 18, where it is shown as comprising complementary blocks 215ª and 215ᵇ which are provided on their inner sides with complementary semi-circular recesses so that they conform to and fit over a portion of the shaft 187 between the friction driving device 52 and the bearing blocks 188. These blocks 215ª and 215ᵇ are provided on their inner faces and on opposite sides of the shaft with opposed sockets adapted to receive coil springs 216 by which the blocks are normally pressed away from each other to cause their outer arcuate surfaces to fit closely against the inner annular surface of the surrounding valve sleeve 217. This sleeve 217 is provided with two ports 217ª and two ports 217ᵇ in which are connected the nipples at the ends of the pipes 212 and 213, respectively, so that communications are thus established with the cylinders by which the cutter bars 50 are operated.

Figures 6, 7:
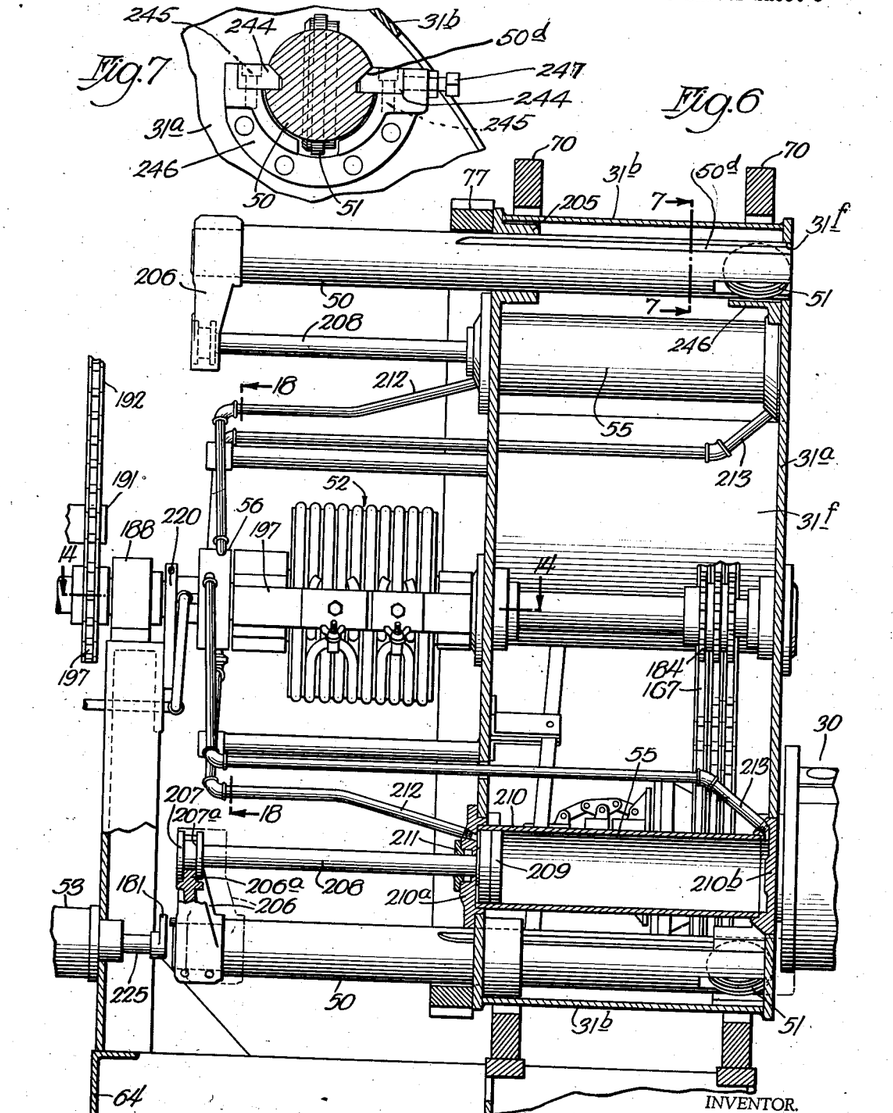
Fig. 6 shows a sectional view taken on the line 6—6 of Fig. 1.
Fig. 7 is a detailed section taken on the line 7—7 of Fig. 6.
Figures 14, 15, 16, 17, 18, 19:
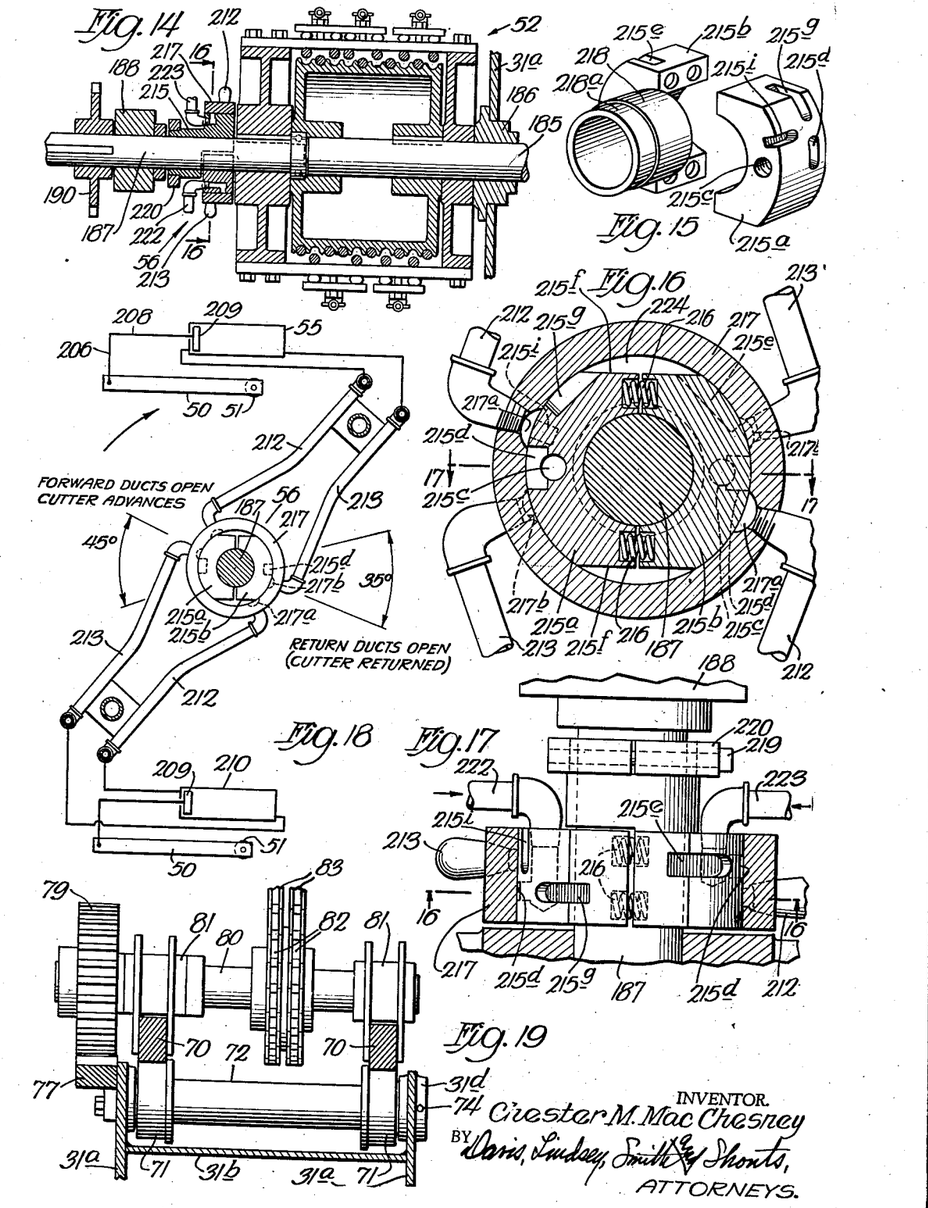
Fig. 14 shows an axial section through one of the friction clutches by which the winding cores are rotated, the section being taken on the line 14—14 of Fig. 6.
Fig. 15 is a perspective view of two complementary air valve members for controlling the admission of compressed air or other fluid to the cylinders by which the cutter bars are operated.
Fig. 16 shows an enlarged transverse section through the valve mechanism which is partially illustrated in Fig. 2, showing the means by which the admission of compressed air to the supply conduits is controlled, the section being taken on the line 16—16 of Fig. 14.
Fig. 17 shows a sectional view taken on the line 17—17 of Fig. 16.
Fig. 18 is a sectional view taken on the line 18—18 of Fig. 6, illustrating the valve mechanism for controlling the admission of compressed air or the like to the cutter bar cylinders, the connections to which are in part illustrated somewhat diagrammatically.
Fig. 19 is a sectional view taken on the line 19—19 of Fig. 1.

The sleeve 217 which is thus connected to the pipes 212 and 213 is adapted to rotate with the wheel or carrier 31 but the inner valve blocks 215ª and 215ᵇ are adapted to be held against rotation on the shaft 187. For this purpose, the block 215ᵇ has attached thereto or formed integrally therewith a laterally projecting sleeve 218 in which the shaft 187 is journaled and this sleeve is provided with a portion 218ª of reduced diameter which has clamped thereon, by means of the cap screw 219, a plate 220, shown in Fig. 17, which extends downwardly and is attached to the upright frame structure below the bearing member 188, as shown in Fig. 6. Each of the valve blocks 215ª and 215ᵇ is provided with a longitudinally extending passage 215ᶜ arranged to communicate with a chamber 215ᵈ which opens through the periphery of the valve block. These chambers 215ᵈ are located diametrically opposite to each other, as shown in Fig. 16, and they communicate with the supply pipes 222 and 223, shown in Figs. 6, 14 and 17, through which compressed air or the like is supplied to the control valve. The two chambers 215ᵈ are offset longitudinally of the shaft 187 and the ports 217ᵃ which communicate with the pipes 212 are similarly offset longitudinally of the shaft with respect to the ports 217ᵇ which communicate with the pipes 213. The pipe 222 thus is arranged to supply compressed fluid to the pipes 212 while the other pipe 223 is arranged to supply the pipes 213.

Assuming that the wheel 31 and the valve sleeve 217 are in such positions that the pipe 212 leading to the upper cylinder 210 is in communication with one of the chambers 215ᵈ through which compressed air is supplied from the pipe 222, the compressed air will then flow to the left-hand end of the upper cylinder, as viewed in Figs. 7 and 18, thereby causing the piston 209 in that cylinder to execute a forward stroke and to cause a corresponding forward stroke of the connected cutter bar 50. During the forward stroke the air in the cylinder at the other side of the piston will be exhausted through the connected pipe 213, the air passing from this pipe through the port 217ᵇ and thence outwardly through a groove 215ᵉ which is formed in the block 215ᵇ and which communicates with an exhaust passage 224 located between the inner wall of the sleeve 217 and the flat faces 215ᶠ of the valve blocks which are then in the upper position, these blocks being flattened on opposite sides for this purpose. Immediately after this forward stroke of the cutter bar has been executed, the pipe 215 which has been supplying air for causing that forward stroke will pass out of communication with the chamber 215ᵈ, shown at the left in Fig. 16, and the port 215ᵇ which communicates with the pipe 213 associated with that cylinder will then pass into communication with the chamber 215ᵈ of the other valve block 215ᵇ. Thereupon, the compressed air passing through the pipe 213 will cause the piston to execute a return stroke during which the air in the cylinder which has previously been supplied through the pipe 212 will be exhausted through that pipe and through a groove 215ᵍ which is formed in the valve block 215ᵃ to communicate with the previously described exhaust passage 224. When the other cylinder 210, which is shown in the lower position in Fig. 6, reaches the upper position in which the cutter bar is to be actuated, the operations which have just been described will be repeated, the air being supplied to and exhausted from the cylinder through the other pair of pipes 212 and 213. In this way, the cylinders which actuate the cutter bars are operated automatically at predetermined points in the cycle of operation of the wheel or carrier 31 and by suitably locating the ports 217ᵃ and 217ᵇ, as well as the chambers 215ᵈ and the grooves 215ᵉ and 215ᵍ, the points at which the cutter bars are actuated and the part of the rotation of the carrier 31 through which the movement of the cutter bar takes place may be regulated as desired.

In addition to the forward and reverse strokes of the cutter bars 50 which are effected by compressed air or the like in the cylinders 210, as just described, there is the initial movement of the cutter bar, previously referred to, for projecting the end of each cutter bar into the path of one of the stops 48 carried by a core 30, when the core is in its lower position, for the purpose of arresting the rotation of the core and holding it against rotation during its subsequent upward swing when its suction cups are brought into engagement with the strip. This is accomplished by the shoe 181, previously referred to, which is arranged to be actuated by compressed air or the like in the cylinder 53, as shown in Figs. 5, 7 and 26. This shoe is located to be in alignment with a cutter bar 50 when the cutter bar is in its lower position with the rotation of the wheel 31 arrested and the shoe also aligns with the rod 179 by which the clutch 54 in the driving connection to the lowermost core 30 is operated, so that when the shoe is forced toward the right, as viewed in Figs. 5 and 7, it will operate to engage the clutch members of the associated clutch 54 and also to push the cutter bar in a forward direction to an extent sufficient to bring it into line with the stop 48 carried by the adjacent core 30 so that the rotation of the core is positively stopped at a predetermined point in its cycle. The shoe 181 which effects these operations is mounted upon the end of a piston rod 225 which is arranged to reciprocate through the end wall of the previously described cylinder 53 to which compressed air is supplied through a pipe 226. A piston 227 is mounted on the rod 225 in this cylinder and, when compressed air is admitted through the pipe 226, the piston moves toward the right against the compression of the coil spring 228, mounted in the cylinder, thus moving the clutch operating rod 179 and the cutter bar 50 in a forward direction. During this time, the piston 209 in the connected cylinder 210 will move in a forward direction to the same extent that the cutter bar is moved, as illustrated by dotted lines in Fig. 6 and, to permit the exhaust of the air in the right-hand portion of the cylinder through the connected pipe 213, at this time, the valve block 215ᵇ is provided with a laterally extending passage 215ⁱ, shown particularly in Figs. 15 and 16, which will then communicate with the port leading to the connected pipe 213 through which the air may be exhausted to the extent necessary to allow the desired limited forward movement of the piston and of the cutter bar. When this forward motion of the cutter bar has been effected, to bring it into the path of the stop 48 on the core, the shoe 181 and the piston 227 will be automatically returned to their normal positions by the coil spring 228 when the valve 45 is again closed.

The latch member 47, which stops and positions the wheel or carrier 31 with one core in the upper winding position and the other core in the lower unloading position, is positioned on the frame adjacent the bottom of the wheel, as shown in Fig. 2, and is illustrated diagrammatically in Fig. 26. This latch member is normally actuated in a forward direction by a coil spring 230 and bears against the side face of the annular gear 77 by which the wheel or carrier 31 is rotated. When the carrier reaches the proper position with one core 30 in the lower unloading position and the other core 30 in the upper winding position, the spring 230 operates automatically to force the end of the latch member 47 into engagement with one of two diametrically opposite notches 77ᵇ in the side face of the gear, thus bringing the wheel 31 to rest. At the same time that this occurs, one end of the notch 47ᵃ in the latch member 47 will engage the handle 231ᵃ of the air clutch valve 231 by which the flow of compressed air to the air clutch 44 through the pipe 232 is controlled, thus closing the valve and causing the hollow ring 107 of the clutch 44 to be deflated, thereby arresting the driving connection to the wheel.

The rotation of the wheel 31 is initiated, as previously stated, by the operator, who opens the latch valve 45 to retract the bolt 47 and admit air to the clutch 44 when he observes a welded joint in the strip approaching the wound strip, as shown in Fig. 21. The opening of this valve starts the rotation of the wheel and also causes the flow of compressed air through the pipe 233 and the branch pipes 226 and 234 to the cylinders 53 and 46, respectively, thereby opening the valve 231 and engaging the clutch 54 of the lower cylinder as described above. This latch valve 45 is shown somewhat diagrammatically in Fig. 26 and is illustrated in greater detail in Fig. 4. It comprises a collar 235 fixed upon the air supply pipe 233 and having an outwardly extending flange engaged by one end of a coil spring 236 which surrounds the pipe and a portion of the collar and which is engaged at its other end by a valve operating sleeve 237 having an annular groove 237ᵃ engaged by pins in the opposite arms of a bifurcated operating lever 238. This lever is pivoted at 239 on a bracket 240 which is secured on the pipe 233 and, when the sleeve 237 is elevated from its normal engagement with the bracket 240, the valve is opened and is held in that open position by a latch member 241 which is pivoted at 242 on one of the supporting rings 70 of the frame structure within which the wheel rotates. This trip lever 241 is of bell crank form, having a transverse extremity 241ᵃ which is adapted to enter the annular groove 237ᵃ when the collar 237 has been elevated by the handle 238, to hold the valve in open position. The trip lever 241 also has a transversely extending arm 241ᵇ which is located in the path of travel of each of two diametrically opposite lugs 31ʰ carried by the wheel 31. As the wheel reaches the position where its rotation is arrested by the engagement of the locking member 47 with the notch 77ᵃ in the ring gear 77, with a resulting closing of the valve 231, one of the lugs 31ʰ engages and trips the lever 241, thus releasing the sleeve 237 and causing the valve 45 to be closed by the spring 236. The closing of this valve shuts off the flow of compressed air through the pipes 233 and 226 to the cylinder 53, and also shuts off the flow of air to the cylinder 46, so that the pistons in these cylinders are then retracted by the associated springs, leaving the clutch 54 of the lower core 30 engaged and leaving the lower cutter bar 50 advanced into the path of the stop 48 carried by the lower core. The lower core is then held against rotation by the adjacent cutter bar but the driving connection to this core is established and the slippage in the driving device 52 takes place until the wheel 31 again rotates and the core in the lower position moves upwardly into engagement with the strip, as shown in Fig. 23. In this way, the core is held against rotation while the suction cups carried thereby operate to grip the strip. This core continues to be held against rotation until after the associated cutter bar has been actuated through a full forward stroke by the associated cylinder 55, as shown in Fig. 23, and has been thereafter fully retracted by that cylinder, as indicated in Fig. 24.

Although the driving clutch 54 of the core 30 which moves upwardly from the unloading position to the winding position is engaged automatically before that movement begins, as stated in the preceding paragraph, in order to insure that the core will be in readiness to rotate and start the winding operation as soon as the strip has been cut off and the associated cutter bar has been withdrawn, it will be understood that the clutch 54 associated with this core may be manually opened by manipulation of the rod 177 and the handle 177ᵇ for the purpose of rotating the core until the slot 30ᵃ, shown in Fig. 25, is in the proper position to receive the hook, carried by a crane or hoist, by which the coil of strip material is removed from the core when the core is in an unloading position. After the rotation of the filled core has thus been stopped, the handle 150 may be manipulated to contract the core and thereby facilitate the removal of the coil.

From the foregoing description, it will be apparent that the present invention provides an improved winding core which permits the winding apparatus to be operated continuously with no interruption in the movement of the strip. The winding operation is also continuous, except for the very brief and temporary interruption which takes place when the two cores are being reversed in position and the strip is being cut off by the action of one of the cutter bars. During the winding operation, the wheel 31 is stationary, as shown in Fig. 20, and the strip material is wound upon the core in the upper position while the lower core is held stationary in the lower unloading position. When the operator observes the welded joint 42 in the moving strip appear in proximity to the outer margin of the coil of material being wound, as illustrated in Fig. 21, that is a signal to him that the coil is complete and he then manually actuates the operating valve 45 to admit compressed air to the cylinder 46 which operates through the piston 243 to retract the locking bar 47 from its engagement with a notch 77ᵇ of the driving gear of the wheel. The retraction of the bar 47 operates to open the valve 231 and thereby admit compressed air to the air clutch 44 so that the expansible member 107 of that clutch is then expanded and a driving connection is established to the wheel which then rotates to move the coil of material from the winding position to the unloading position. At the same time that the cylinder 46 is actuated to retract the bar 47, compressed air is admitted to the cylinder 53, there actuating the shoe 181 through the piston 227 so that the cutter bar 50 which is then in the lower position is moved forwardly into the path of the stop 48 carried by the lower core 30 and the bar 179 associated with the lower core is actuated to close the driving clutch 54 of that core. The parts are then in the condition shown in Fig. 22 and, as the wheel rotates, the coil of material assumes a midposition, shown in Fig. 23, where a clip 57 is applied to the outer layers of the coil to prevent the unwinding thereof when the outer layer is subsequently cut off from the source of supply and, at the same time, the core 30 which has been in the lower position moves upwardly and reaches a position where the rotating wheel actuates the control valve 56 to cause the proper sequence of movements of the piston in the cylinder 55 associated with that core. The cutter bar then moves forwardly through its cutting stroke through a certain angle of movement of the wheel, as illustrated in Fig. 23, with the strip of material being bent around the empty core as there illustrated and with the supply portion of the strip gripped by the suction cups on the empty core. As the motion of the wheel continues, the stage is reached where the parts occupy the relative positions shown in Fig. 24 where the cutter bar is retracted during a certain part of the angular movement and the full core approaches the lower position. Before the lower position is reached, as shown in Fig. 25, the valve 45 is automatically closed by the engagement with the latch member 241 of one of the lugs 31h carried by the wheel so that the valve 45 is automatically closed by its spring, thereby shutting off the flow of compressed air to the cylinders 36 and 53, allowing the shoe 181 to be retracted by its associated spring 228 and permitting the bar 47 to be moved against the face of the gear 77 by its spring 230. The bar 47 then snaps into engagement with another notch 77b of the gear to arrest the rotation of the wheel and the driving connection is at the same time broken by the deflation of the expansible member 107 of the air clutch 44. The coil of material may then be removed from the full reel in the lower position, manually manipulating the associated clutch 54, if necessary, to get the core into the right-angular position for connection with the hoist. At the same time that this occurs, the empty core having the end of the strip attached thereto reaches the upper winding position and its rotation immediately begins because the driving connection has previously been established by the closing of its associated clutch 54 and the rotation starts as soon as the associated cutter bar 50 is withdrawn.

Although one form of the invention has been shown and described by way of illustration, it will be understood that it may be constructed in various other embodiments without departing from the scope of the appended claims.

I claim:

1. Apparatus for winding metal strip material comprising a rotatable cylindrical core, and suction cups carried by the periphery of said core for engaging and holding a metal strip upon contact with said strip under pressure.

2. Apparatus for winding metal strip material comprising a rotatable cylindrical core, and suction cups carried by the periphery of said core for engaging and holding a metal strip upon contact with said strip under pressure, and means for adjusting the positions of said cups with respect to the surface of said core.

3. Apparatus for winding metal strip material comprising a cylindrical core having a plurality of resiliently mounted suction cups adapted to engage and hold a metal strip coming into engagement with said core.

4. Apparatus for winding metal strip material comprising a cylindrical core having a plurality of resiliently mounted suction cups adapted to engage and hold a metal strip coming into engagement with said core, and means for adjusting the mountings of said suction cups to vary the positions of their strip engaging portions.

CHESTER M. MacCHESNEY.